UNITED STATES PATENT OFFICE.

TOBIAS NEW, OF NEW YORK, N. Y.

IMPROVEMENT IN ROOFING MATERIAL.

Specification forming part of Letters Patent No. 209,830, dated November 12, 1878; Reissue No. 8,546, dated January 21, 1879; application filed January 2, 1879.

*To all whom it may concern:*

Be it known that I, TOBIAS NEW, of the city and State of New York, have invented a new and useful Improvement in Ready-Prepared Roofing, of which the following is a clear, full, and exact description:

Roofing fabric has usually been made of two or more layers of paper, and a bituminous material for cementing together; but bitumen and bituminous material lack toughness and elasticity, and are liable to break and crack in handling. It is also found that they are liable to crack and break under the influence of constantly-changing temperatures; also, to be sticky, sometimes so much so as to make it impossible to use it.

To overcome these difficulties I use a vegetable gum or rosin, which is dissolved at a comparatively low temperature, whereby I am enabled to mix with the rosin any fiber—such as wool, hair, or any woody fibers—to give body to the composition and add toughness and elasticity.

To enable others skilled in the art to make and use my invention, I will proceed to describe the exact manner in which I have carried it out.

I prefer using the rosin or certain of the products of the rosin-producing pine.

It is well known that after the distillation of the turpentine the residuum is rosin; but between the turpentine proper and the rosin there is a medium product of a liquid or semi-liquid consistency. This is the article I prefer to use, and with this may be mixed a small quantity of the oil of rosin or any other suitable oil to secure the best consistency for mixing the fiber prior to its application to the paper or other material which may be used in preparing the roofing. The rosin, however, may be more convenient for use, and this may be melted and the oil added to secure a product much resembling the product before referred to.

The rosin can be brought to a liquid state at a temperature which will not injure the fiber, which is to be introduced, as before stated, to give body, toughness, and elasticity to the composition.

In mixing in the fiber the proportion should be about from forty to seventy-five per cent. of the fibrous material, according to the circumstances under which the roofing is to be used.

When the composition is ready for application a strip of paper, preferably saturated paper, known commercially as "roofing-felt," or other material, is coated with a layer of the composition over the whole surface of any desired thickness. Then another strip of the material, paper, or cloth is laid thereon, and another layer of the composition is added. On this is placed another layer of paper or fabric, and so on until the desired number of layers and thickness is obtained. The whole pile is then subjected to a heavy pressure, firmly uniting all the layers of felt or other material and composition in one solid and homogeneous mass. This roofing is then cooled and put up in rolls ready for the market.

It is evident from the foregoing description that a strip of paper or other material may be subjected to a saturating-bath in the composition, and then be pressed into roofing between the two opposite layers, or the outside layers may be coated and then be pressed upon the middle layer without departing from the spirit of my invention. Two layers only may be used with an intermediate coating of the composition or rosin. This vegetable rosin can be handled with entire comfort, while the use of bitumen or bituminous material is disagreeable to handle, from its odor, and soils everything it touches.

Roofing made according to my invention has great toughness and elasticity without the addition of the fiber, but the latter is desirable, as it adds body to the article.

Having thus described my invention, I claim as new and desire to secure by Letters Patent—

As a new article of manufacture, a ready-prepared roofing consisting of two or more layers of paper or fabric, in combination with layers of vegetable rosin, prepared as described, with or without the fiber, and the whole reduced to a solid mass by pressure, substantially as described.

TOBIAS NEW.

Attest:

NATHAN DUFF,

R. B. POWELL.